Sept. 28, 1943.      E. RUSKA      2,330,628
MAGNETIC LENSES FOR ELECTRON-OPTICAL APPARATUS
Filed July 30, 1940
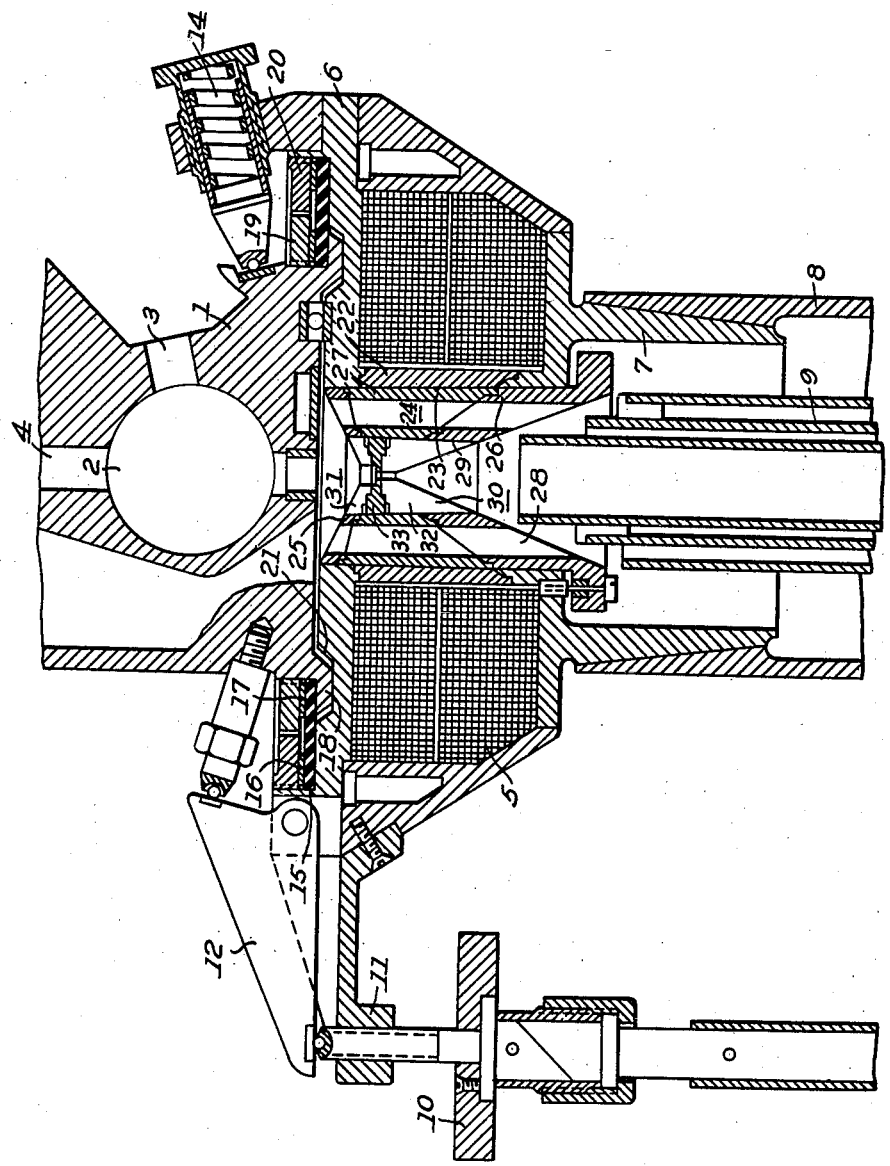
Inventor:
ERNST RUSKA
Attorney.

Patented Sept. 28, 1943

2,330,628

UNITED STATES PATENT OFFICE 2,330,628

MAGNETIC LENSES FOR ELECTRON-OPTICAL APPARATUS

Ernst Ruska, Berlin-Spandau, Germany; vested in the Alien Property Custodian

Application July 30, 1940, Serial No. 348,492
In Germany July 14, 1939

7 Claims. (Cl. 250—161)

This invention relates to a magnetic lens for electron-optical apparatus, particularly for electronic microscopes.

It is known in the art to employ in electron optical apparatus, for instance in electronic microscopes, magnetic lenses in which a pole shoe system is detachably secured to the magnet body proper. In this case the magnetic lenses are often so designed that the pole shoe system itself is made of a plurality of parts; i. e. it consists of the inner pole shoe proper and of a pole shoe carrier. The detachable pole shoe system and the individual parts thereof have hitherto been secured to one another by means of threaded parts which have the disadvantage that they cannot be so accurately cut as to form a uniform and reproducible air gap. Consequently, the use of such threaded parts renders the magnetic lenses highly astigmatic. Flat rubber sealings which render the apparatus non-rigid have previously been employed in electro-magnetic lenses between the coils and the tubes connecting the same so that the axes of the individual parts of the electronic microscope were more or less out of alignment.

An object of the invention is to provide a lens, for instance an electromagnetically energized lens, for electron optical apparatus, capable of producing a strictly symmetrical and coaxial magnetic field.

Another object of the invention is to provide lenses of the above-mentioned character with pole shoe systems which may be rapidly and accurately interchanged.

According to the invention, the above-mentioned objects are accomplished by providing the pole shoe system and the magnet body proper with conical seat surfaces, respectively, these surfaces tightly engaging each other.

When employing arrangements in which the pole shoe system is made of various parts, also the individual parts of such a pole shoe system are so designed according to the invention that they have conical surfaces engaging each other so that the individual parts may be easily exchanged. By the use of conical surfaces which may be made accurately concentric by grinding, a symmetrical lens system is obtained and therefore a symmetrical field also. In electronic microscopes having a plurality of coils the individual parts of the microscope may be so coaxially arranged according to the invention that the individual parts, for instance the coil bodies, also provided with conical surfaces, fit in one another. In this manner a rigid apparatus is obtained in which a coaxial and accurate arrangement of the individual parts is ensured.

The accompanying drawing illustrates an embodiment of the invention by showing a vertical sectional view of a part of an electronic microscope.

Referring to the drawing, 1 denotes the object sluicing device having a transversal bore 2 for the reception of a bored cock plug (not shown) to be provided with the object to be examined. 3 is a passage for introducing the object into the vacuum chamber. The upper part of the microscope containing the cathode and, usually, a condenser lens, are not shown in the drawing. The electron beam enters through the axial passage 4 of the sluicing device and upon being modified by the object passes through an objective lens causing the beam to produce a magnified image of the object which, as a rule, is further magnified and projected onto a screen by means of a projection lens. The objective lens contains an energizing objective coil 5 placed on a metallic structure forming an upper cover 6 and a ground conical neck 7 which fits in a correspondingly dimensioned conical bore of the stationary vacuum wall 8. The wall 8 forms the connecting tube for the projection lens (not shown). 9 denotes cylindric shields for protecting the electron beam passing through the inner cylinder against external magnetic disturbing fields. The electron beam on passing through the central cylindric shield strikes the fluorescent screen (not shown).

To adjust a given portion of the image of the object to be tested, the object carrier may be moved with respect to the stationary objective coil 5. To this end, adjusting screws 10 are employed which when rotated in the clockwise and counterclockwise direction move in the upward and downward direction in their respective supports 11. Only one screw 10 and its stationary support 11 are visible in the sectional view of the drawing, as the other screws are disposed in different vertical planes in order to permit displacing the sluice body 1 in any desired direction of the transversal plane of movement. The screws 10 may be provided with an extension rod 10' or the like, connecting them with a manual within easy reach of the operator. The movement brought about by the screws 10 is transmitted through a lever 12 to a thrust body 13 firmly secured to the sluice body 1. 14 is a resilient counter member arranged opposite to the thrust body 13. To seal the circular opening left between the two parts 1 and 6 movable with respect to one another, a rubber washer 15 is employed whose outer edge is pressed against the cover plate 6 by a pressure ring 16 and whose inner edge is pressed against the circular flange 18 of the sluice body 1 by a pressure ring 17. Two threaded rings 19 and 20 serve to exert pressure on the pressure rings 16 and 17, the latter being secured against rotation by corresponding lugs (not illustrated). Since the pressure rings 16 and 17 are prevented from being rotated, the rubber washer 15 is not stressed in the direction of rotation when screwing in the rings 19 and 20 to press the pressure rings 16 and 17 against the rubber washer. The ring 19 is provided with an internal thread engaging a corresponding thread of the sluice body 1. The ring 11 is provided with an external thread in engagement with a corresponding thread of the plate 6. Owing to the space left between the pressure rings 16 and 17 above the sealing ring 15, the object carrier may be moved with respect to the objective coil so as to attain the desired adjustment. The distance between the rings 19 and 20 may be approximately determined by the eye and serves therefore as a gauge for the coarse centering of the sluice body 1 with respect to the plate 6. The flange 18 is given a trapezoidal cross-section as shown in the drawing which rests with sufficient clearance in a correspondingly trapezoidal depression 21 of the plate 6.

Between the parts 6 and 7 is interposed a brass ring 22. The closed coil body thus formed is provided on the side of the inner bore with a conical surface 23 in which fits a correspondingly conical surface of a pole piece carrier 24. The pole piece carrier consists of the parts 25, 26 and 27 arranged in the manner shown in the drawing. The parts 25 and 26 consist of magnetic material, whereas the central piece 27 is made of brass. In the carrier 24 are provided bores 28 which form a free communication between the vacuum chambers above and below the lens structure. The pole piece carrier has an inner conical surface 29 in which is inserted the pole structure 30 proper having a corresponding outer conical surface. The pole structure 30 consists of an upper pole shoe 31, a lower pole shoe 32 and of a brass ring 33 arranged therebetween. As apparent from the drawing, the upper pole shoe 31 is magnetically series-connected through the upper part 25 of the pole piece carrier with the cover plate 6 of the lens body, while the lower pole shoe 32 is magnetically series-connected with the lower part 26 of the pole piece carrier and the lower part of the magnetic lens body. Hence, a magnetic circuit is established causing the perforated pole shoes 31 and 32 to produce a rotation-symmetrical lens field between them when the lens coil 5 is electrically energized. Also as illustrated, the inner pole structure 30 is detachable from its carrier 24 while the latter is detachable from the magnetizable lens body, so that the detachable units may be exchanged for corresponding other units. The conical seat surfaces between the separable units have a relatively great axial length and a relatively slight inclination towards the axis and therefore ensure an accurate seating and an automatic centering of the separable units relatively to one another without necessarily requiring additional adjusting and fastening means.

What is claimed is:

1. A magnetic lens for electron-optical apparatus, in particular electron microscopes, comprising an outer lens structure substantially of annular shape having a relatively large axial bore, said outer lens structure including an energizing coil and a body of magnetic material having two parts of magnetically opposite polarity bordering said bore and spaced axially from each other, an intermediate axially apertured carrier seated in said bore and having two axially spaced magnetic sections and an intermediate non-magnetic section interconnecting said magnetic sections, said two magnetic sections being in engagement with said two parts respectively, and a central pole shoe structure seated in the aperture of said carrier and being composed of two axially spaced pole shoes and an intermediate non-magnetic member, said two pole shoes being in engagement with said two sections respectively, said outer lens structure, carrier, and pole shoe structure being detachable relative to one another and having conical seat surfaces engaging one another to secure in centered position said carrier to said outer structure and said pole shoe structure to said carrier.

2. In an electron-optical apparatus having a discharge vessel for maintaining a directed corpuscular beam, a magnetic lens comprising an outer lens structure of annular shape having a relatively large axial bore and containing two magnetic members firmly connected with each other in axially spaced relationship, and an inner structure having a narrow axial aperture for the passage of the beam, said inner structure comprising two magnetic pole shoes and a non-magnetic spacing member disposed intermediate said pole shoes and firmly connected therewith to form a unit, said unit being seated in said bore of said outer lens structure and detachable as a whole from said outer structure, the seat surface of said bore and the outer surface of said inner structure having conical shape for holding said two structures together in centered position relative to each other with said pole shoes contacting said magnetic members respectively.

3. In an electron-optical apparatus having a discharge vessel for maintaining a directed corpuscular beam, a magnetic lens comprising an outer lens structure of annular shape having a relatively large axial bore and containing two magnetic members firmly connected with each other in axially spaced relationship, and a central pole shoe structure having a narrow axial aperture for the passage of the beam, said inner structure comprising two magnetic pole shoes and a non-magnetic spacing member disposed intermediate said pole shoes and firmly connected therewith to form a unit, said unit being seated in said bore of said outer lens structure and detachable as a whole from said outer structure.

4. In an electron-optical apparatus having a vacuum-tight enclosure for maintaining a directed corpuscular beam, an outer lens structure of annular shape having a relatively large axial bore, an inner structure having a narrow axial aperture for the passage of the beam and containing two magnetic pole shoes and a non-magnetic spacing member disposed intermediate said pole shoes and connected therewith to form a structural unit, said unit being seated in said bore of said outer lens structure and detachable as a whole from said outer structure, the seat surface of said bore and the outer surface of said inner structure having conical shape for holding said two structures together in centered position relative to each other, said enclosure being subdivided in a direction transverse to the direction of the beam and at a place close to said lens structure to form separable enclosure portions, and said conical surfaces being disposed so as to have their largest diameters at the side of said place of subdivision to permit inserting and removing said inner structure from said side when said enclosure portions are separated from each other.

5. In an electron-optical apparatus having a vacuum-tight enclosure for maintaining a directed corpuscular beam, two annular magnetic members forming part of said enclosure and being spaced in the direction of said beam to form a lens gap between them, a non-magnetic annular member disposed between said magnetic members to seal said gap, means for magnetically energizing said magnetic members, and two annular pole shoes disposed in said enclosure and having conical shape for magnetically reducing said lens gap in the axial and radial directions, said pole shoes being detachably mounted on said magnetic members and in magnetic contact with said members respectively.

6. In an electron-optical apparatus having a vacuum-tight enclosure for maintaining a directed corpuscular beam, two annular magnetic members forming part of said enclosure and being spaced in the direction of said beam to form a lens gap between them, a non-magnetic cylindrical member disposed between said magnetic members so as to form an intermediate part of said enclosure, means disposed outside of said enclosure around said cylindrical member for energizing said magnetic members, and two annular pole shoes disposed in said enclosure and having conical shape for magnetically reducing said lens gap in the axial and radial directions, said pole shoes being detachably mounted on said magnetic members and in magnetic contact with said members respectively.

7. In an electron-optical apparatus having a vacuum-tight enclosure for maintaining a directed corpuscular beam, two annular magnetic members forming part of said enclosure and being spaced in the direction of said beam to form a lens gap between them, one of said magnetic members having an axially extended portion forming a tubular section of said enclosure, a ring of non-magnetic material disposed between and coaxially with said magnetic members to seal said gap.

ERNST RUSKA.